United States Patent [19]

Han

[11] Patent Number: 4,759,051

[45] Date of Patent: Jul. 19, 1988

[54] COMMUNICATIONS SYSTEM

[75] Inventor: Kuixuan Han, Long Island City, N.Y.

[73] Assignees: A. A. Hopeman, III; Ching C. Hopeman, both of Waynesboro, Va.

[21] Appl. No.: 25,970

[22] Filed: Mar. 16, 1987

[51] Int. Cl.⁴ ............................................. H04Q 7/04
[52] U.S. Cl. ..................................... 379/59; 455/33; 455/25
[58] Field of Search ............... 379/59, 60, 63; 455/33, 455/11, 25, 17, 19, 58, 56, 54

[56] References Cited

U.S. PATENT DOCUMENTS

| | | | |
|---|---|---|---|
| 3,593,138 | 7/1971 | Dunn et al. | 455/11 |
| 3,906,166 | 9/1975 | Cooper et al. | 179/41 |
| 3,955,140 | 5/1976 | Stephens et al. | 455/11 |
| 3,984,807 | 10/1976 | Haemmig | 455/11 |
| 4,127,744 | 11/1978 | Yoshikawa et al. | 379/60 |
| 4,144,411 | 3/1979 | Frenkiel | 379/60 |
| 4,217,588 | 8/1980 | Freeny, Jr. | 455/11 |
| 4,369,520 | 1/1983 | Cerny, Jr. et al. | 455/137 |
| 4,451,699 | 5/1984 | Gruenberg | 379/59 |
| 4,485,486 | 11/1984 | Webb et al. | 455/33 |
| 4,539,706 | 9/1985 | Mears et al. | 455/11 |
| 4,578,815 | 3/1986 | Persinotti | 455/15 |
| 4,593,273 | 6/1986 | Narcisse | 340/539 |
| 4,633,463 | 12/1986 | Mack | 370/95 |
| 4,659,878 | 4/1987 | Dinkins | 370/71 |
| 4,688,259 | 8/1987 | Edridge | 455/12 |
| 4,704,734 | 11/1987 | Menich et al. | 455/33 |

FOREIGN PATENT DOCUMENTS

| | | | |
|---|---|---|---|
| 2659569 | 5/1978 | Fed. Rep. of Germany | 455/33 |
| 2806178 | 8/1978 | Fed. Rep. of Germany | 455/33 |
| 3130153 | 2/1983 | Fed. Rep. of Germany | 455/33 |
| 2438389 | 6/1980 | France | 455/33 |
| 0044233 | 4/1981 | Japan | 379/59 |
| 0058338 | 5/1981 | Japan | 455/33 |
| 0103436 | 6/1984 | Japan | 455/33 |
| 2162404 | 1/1986 | United Kingdom | 379/59 |

OTHER PUBLICATIONS

A. G. Sanchez, "Design of a Multiple Access Radio System for Rural Telephony", I.T.U. Tel. Jour., vol. 50-XI/1983, pp. 615-621.

Primary Examiner—Robert Lev
Attorney, Agent, or Firm—Howson and Howson

[57] ABSTRACT

In a cellular radiotelephone system, a geographical area is divided into radio zones, each of which comprises a cell set, and a plurality of transponders which relay signals from portable units to the cell set, and from the cell set to the portable units. The use of transponders reduces the talk-back distance. This, in turn, results in a reduction of the power requirement of the portable units, which can therefore use smaller batteries and smaller transmitter components with a resulting reduction in size and weight. No hand-off takes place as the portable unit moves from transponder to transponder within the radio zone. Thus, the subdivision of the radio zone into transponder areas does not overburden the hand-off supervisory system.

The number of channels assigned to a radio zone can be changed to suit conditions. In addition, however, the shapes and sizes of the radio zones can be varied with changes in user dispersion, to reduce the likelihood that all assigned channels in a given radio zone will be in use at the same time. The change in shape and size of a radio zone is carried out by breaking the communication link between a group of transponders and one cell set, and establishing a communication link between the same transponders and a different cell set.

Hand-off occurs when a portable unit moves from one radio zone to another. The portable unit generates a hand-off request signal when the magnitude of the downlink voice signal falls below a preestablished level.

7 Claims, 10 Drawing Sheets

| USER'S PHONE NUMBER | HAND-OFF REQUEST SIGNAL |
|---|---|

| USER'S PHONE NUMBER | HAND-OFF REQUEST SIGNAL | TRANSPONDER I.D. NUMBER |
|---|---|---|

COMMUNICATIONS SYSTEM

BRIEF SUMMARY OF THE INVENTION

This invention relates to communications systems, and more specifically to an improved cellular radiotelephone communications system for voice communication between radiotelephone units and other telephones or radiotelephone units.

In a conventional cellular radiotelephone system, the geographical area served by the system is divided into a pattern of radio zones. These zones form a patchwork coverage of the area served. Each zone contains a base station. The base stations are all connected to a mobile telephone central control and switching office which exercises supervisory control over the system. Each base station operates in several assigned voice channels selected so that they do not interfere with channels of nearby zones. Because of the restricted power and range of the base stations and of the portable units, each set of zone frequencies can be reused in a non-adjacent zone. However, because adjacent zones use different sets of frequencies, the cellular system operates by a "hand-off" process which takes place as a portable unit moves from one zone to another. The supervisory system automatically follows each portable unit by monitoring its transmitted signal strength, as received by nearby base stations. When a portable unit enters a new zone, the supervisory system automatically causes the portable unit to switch to a new uplink and downlink channel pair available in the zone being entered.

Currently available portable units are suitable for automotive use, but cannot be conveniently carried about on the person. The circuitry of a portable unit can be miniaturized. However, the size and weight of its batteries, and the size and weight of components of the transmitter section make the portable unit so large and heavy that it is not suitable for personal use unless installed in a vehicle.

Radio zones in cellular mobile communications systems currently in use are typically one to twenty miles across. Reducing the sizes of these zones, and thus reducing the power requirements of the transmitter of the portable unit, would not solve the problem of miniaturization, because the supervisory system would need to handle hand-offs too frequently. At a zone size of one mile across, for example, the frequency of hand-offs would put a strain on the computer of the supervisory system.

Mobile telephone communications systems having multiple fixed receiving antennas for each fixed transmitting antenna have been proposed for the purpose of reducing the size and weight of the portable units. These systems, however, have limitations so far as channel handling capability is concerned.

Another problem in conventional cellular radiotelephone systems is that occasionally the assigned channels in a given zone may all be in use. When this occurs, a user may not be able to obtain access to the system when he desires to do so. This condition may occur occasionally, even though elaborate measures are taken to predict the usage of each of the zones in a cellular system.

The principal object of this invention is to overcome the foregoing problems, and specifically to provide a practical portable radiotelephone communications system in which the portable units are small and light in weight so that they can be more conveniently carried on the person, for example as pocket-sized units. It is also an object of the invention to provide improved user access in a radiotelephone communications system. Another object of the invention is to enable networks of fixed telephones to be set up rapidly and inexpensively by reducing or eliminating the need for overhead or underground cables. Still another object of the invention is to make it possible to change positions of telephones, in offices or homes, for example, without rewiring, and to make it possible for a telephone subscriber to move from one location to another without the need for installing a new telephone line or changing the subscriber's telephone number. A further object is to reduce the cost to the telephone subscriber by enabling a number of subscribers to share a single telephone channel.

The communications system in accordance with the invention is similar to a conventional cellular system in that it comprises a telephone control and switching office, at least one local telephone office connected to the switching office and including means to connect the switching office to selected fixed telephones, and a plurality of cell sets, each connected to the switching office through a two-way communication link. However, the system of the invention differs from prior cellular systems in that each cell set has associated with it a plurality of relay transponders. Each cell set and its associated transponders are located in a separate geographically defined radio zone. Within each radio zone, a two-way radio communication link is provided between each transponder and the cell set. Each transponder includes means for relaying uplink and downlink radio signals between its associated cell set and radiotelephone units in the vicinity of the transponder. Each cell set includes means for relaying two-way communications signals between its associated transponders and the switching office, and also includes means for communicating directly with radiotelephone units in the immediate vicinity of the cell set and for relaying two-way communications signals between the last-mentioned radiotelephone units and the switching office.

As a portable unit moves about a radio zone, it can communicate directly with the radio zone's cell set, if it is in the vicinity of the cell set. Otherwise, it communicates with the cell set through one or more relay transponders. The use of relay transponders reduces the power requirements of the portable units by reducing the "talk back" distance. Therefore, they can use small, comparatively inexpensive batteries, and can be made so small and light in weight that they can be more easily carried about on the person.

No hand-off occurs as a portable unit moves about from transponder to transponder within a radio zone. All transponders within the radio zone operate on the same set of voice channels. As a portable unit moves from one transponder to another, the nearest transponder takes over, without any switching of channels. Consequently, the reduction of power in the portable units and the division of the radio zone into a plurality of transponder cells does not place increased burdens on the hand-off supervisory system.

Hand-off does take place when a portable unit moves from one radio zone to another. The hand-off system of the invention is unique in that each portable unit monitors the average strength of the downlink voice channel in use, and transmits a hand-off request signal if the strength of the received downlink signal falls below a preestablished level. The control office determines the radio zone being entered by the portable unit by comparing the strength of the hand-off request signal at several transponders in the vicinity of the portable unit. Otherwise hand-off is carried out by the same procedure currently in use in conventional cellular telephone systems.

There are two ways to improve the users' access to the system. One way is to change the number of channels assigned to each radio zone to satisfy prevailing conditions of usage. In a busy system, however, even if channel reassignment is used, there may still be an insufficient number of available channels to handle all of the calls in all of the zones. Therefore, in accordance with the invention, channel reassignment is either supplemented or replaced by a system in which the sizes and shapes of the radio zones are changed as conditions change. For example, during daytime hours, the radio zones in a business district can be reduced in size so that each zone is likely to contain fewer portable units, and the ratio of available channels to the number of users in each such zone is increased. Thus, the channels assigned to the reduced radio zone are less likely to be all in use at any given time. During evening hours, the business area radio zones can be enlarged to include portions of outlying areas, and at the same time, the radio zones in the outlying areas can be correspondingly reduced in size. Changing the size and shape of radio zones is accomplished in a simple manner by taking a transponder or a group of transponders originally assigned to one cell set, and assigning them to a different cell set, the changes being determined on the basis of a statistical average.

Further objects, advantages and details of the invention will be apparent from the following detailed description, when read in conjunction with the drawings.

DETAILED DESCRIPTION

In the practice of the invention, a geographical area is divided into radio zones. For convenience, each of these radio zones can be thought of as further subdivided into equilateral, equiangular hexagons of uniform size. Uniform hexagon size has two advantages. First, uniformity makes it unnecessary for the portable units to be capable of switching between different power levels, as is the case with conventional mobile cellular telephones. Secondly, uniformity of hexagon size means that the transponders can be of standard design, thereby reducing overall system cost.

A radio zone can be of any desired shape, and may consist of any desired number of subdivisions. A given telephone system can comprise radio zones of different sizes and shapes.

Figures 1, 9, 10:
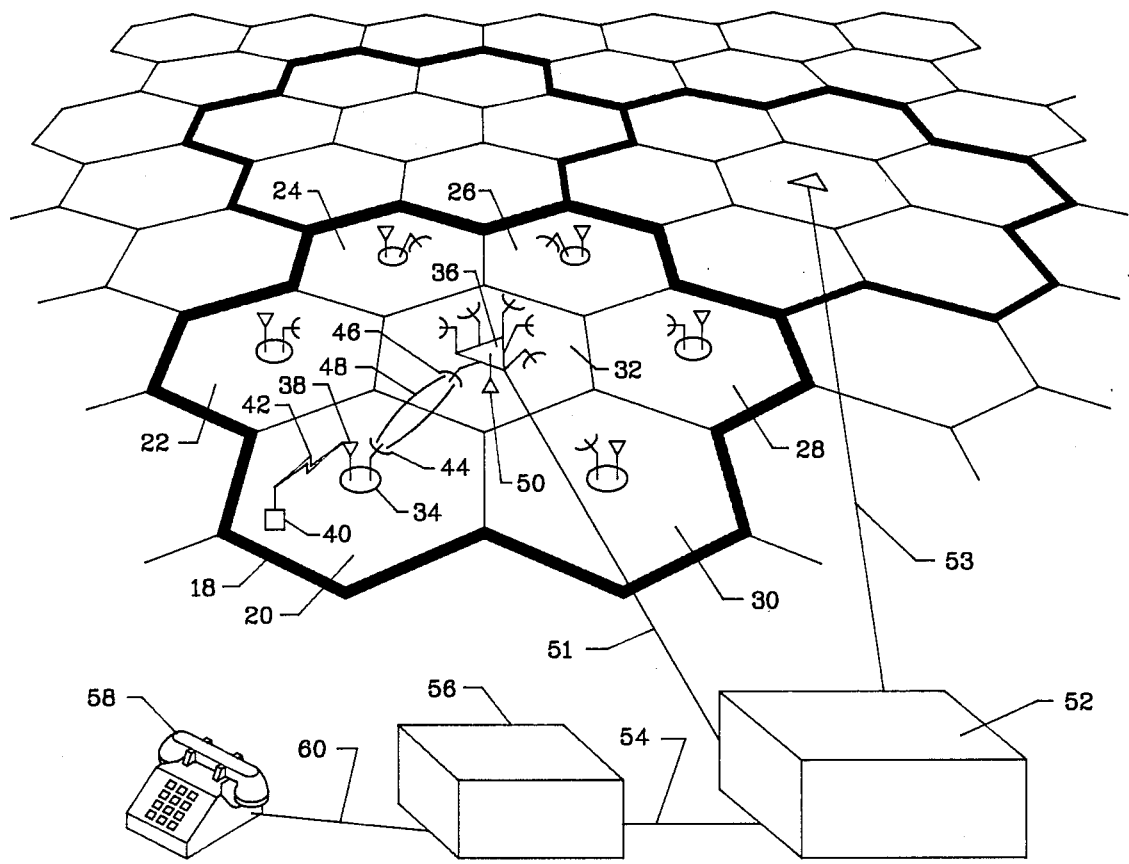
FIG. 1 is a schematic diagram illustrating the radio zone arrangement in a very simple embodiment of the invention.
FIG. 9 is a block diagram showing the format of a hand-off request signal.
FIG. 10 is a block diagram showing the format of a signal generated in a transponder in response to a hand-off request.

FIG. 1 shows a typical radio zone 18, comprising seven hexagonal cells 20, 22, 24, 26, 28, 30 and 32. Hexagonal cell 32 is centrally located within the zone, and six hexagons 20–30 surround the central hexagon. Each of the surrounding hexagons 20–30 contains a centrally located transponder for radio communication with portable units located in its hexagon. Central hexagon 32 also contains a cell set 36.

Transponder 34 is typical. It has an omnidirectional antenna 38 for communication with portable units within hexagon 20. Instead of an omnidirectional antenna, several directional antennas, each covering a different part of a cell may be used. Alternatively, if the transponder is not centered in a cell, its antenna may have a directional characteristic enabling it to cover the entire cell.

Two-way communication is shown established between transponder 34 and portable unit 40 over radio communication path 42. Directional antenna 44 of transponder 34 communicates with directional antenna 46 of cell set 36 over path 48. Directional antenna 46 is one of six directional antennas associated with the cell set. Each of these directional antennas is arranged to provide two-way communication between the cell set and a transponder in one of hexagons 20–30. Cell set 36 also has an omnidirectional antenna 50 for communication with portable units located within central hexagon 32.

Cell set 36 is in communication with portable telephone switching and control office 52 over path 51, which can be a microwave link, a wired link, a fiberoptic link, or any other form of two-way communication link. Office 52 is similarly connected to the cell sets of other radio zones, e.g. over path 53. Office 52 is connected to local telephone office 56 over lines 54, and the local telephone office is connected to fixed telephones such as telephone 58, which is connected to local office 56 through line 60.

Portable unit 40 can be placed in communication with fixed telephone 58 by relaying signals through transponder 34, cell set 36, switching office 52 and local telephone office 56.

In conventional cellular telephone systems, the size and weight of the batteries and transmitter components were the main factors contributing to the size and weight of the portable units. The portable units could not be carried conveniently on the person. In the system of the invention, the division of radio zones into small hexagons, each with a relay transponder, allows the portable units to use much smaller batteries and less powerful, and therefore smaller, transmitter components. A typical hexagonal subdivision of a radio zone has a maximum dimension of approximately one mile. Consequently the maximum length of a radio link between a portable unit and a centrally located transponder within a hexagon is approximately one-half mile. Communication over this short distance can be carried out with low power. Consequently, the batteries and transmitter components of the portable units, can be small in size and light in weight. The portable unit can be easily carried about by an individual, and kept in the individual's pocket when not in use.

In accordance with prior cellular telephone practice, reduction of the size and weight of portable units by reducing radio zone size was not possible because reduction of zone size would place prohibitive requirements on the hand-off systems which are activated when a portable unit moves from one zone to an adjacent zone. The frequency of hand-offs could overburden the computer of the supervisory system. Furthermore, hand-off times would be increased and interrupt communications or at least create an annoyance. In accordance with the invention, however, hand-off takes place only when a portable unit moves from one radio zone to another. No hand-off takes place when a portable unit moves from one hexagonal cell to another within the same radio zone. When voice communication is first established between a portable unit and a transponder or cell set, a pair of voice channels consisting of an uplink channel and a downlink channel, is established. These channels remain in effect as the portable unit moves about from hexagon to hexagon within the radio zone during a given telephone call. When a portable unit moves from one radio zone to an adjacent radio zone, hand-off takes place in a manner which will be described.

One feature of the invention is its ability to accommodate changes in the geographic distribution of portable telephone traffic by radio zone rearrangement. These changes may occur, for example between daytime and evening, in a system which encompasses both a business district and a residential area. During business hours, when most of the portable telephone traffic is concentrated in the business district, the business district itself can be divided into relatively small radio zones, each of which is then capable of handling all of the portable units within it. At the same time, the radio zones in the residential areas can be made large, because concentration of portable telephone traffic in the residential area is comparatively low. During evening hours, however, the concentration pattern shifts, and the radio zones can be rearranged so that the radio zones in the residential areas are reduced in size. It is even possible to set up a radio zone which encompasses both business and residential areas.

Figure 2:
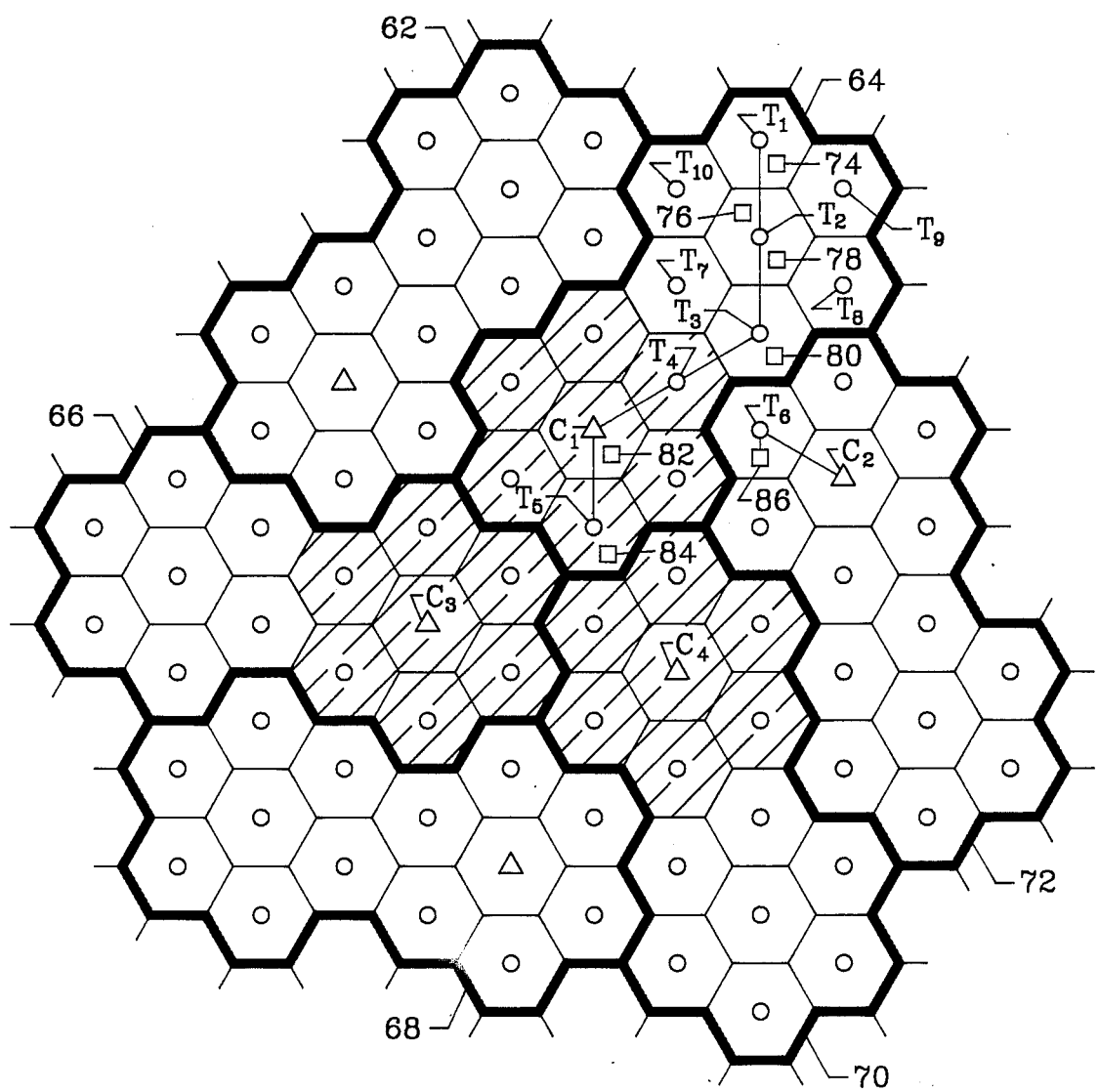
FIG. 2 is a schematic diagram of a more elaborate embodiment, showing a first arrangement of radio zones in a geographical area.

FIG. 2 illustrates a typical arrangement of radio zones during evening hours. Each zone consists of fourteen hexagons, thirteen of which contain transponders, and the fourteenth of which contains a cell set. In FIG. 2, radio zones are indicated at 62, 64, 66, 68, 70 and 72. The business district in FIG. 2 is indicated by cross-hatching. Part of each of zones 64, 66 and 70 is in the business district. The cell set $C_1$ for zone 64 is located in the business district. Portable units are shown at 74, 76, 78 and 80 in the residential part of zone 64, and portable units 82 and 84 are indicated in the business district within zone 64. A communication path is shown from transponder $T_1$ through transponders $T_2$, $T_3$ and $T_4$ to cell set $C_1$. Signals to and from portable unit 74 are relayed through transponders $T_1$, $T_2$, $T_3$ and $T_4$ to cell set $C_1$. Signals to and from portable units 76 and 78 are relayed through transponders $T_2$, $T_3$ and $T_4$ to cell set $C_1$. Signals to and from portable unit 80 are relayed through transponders $T_3$ and $T_4$. Signals to and from portable unit 82, which is in the same hexagon as cell set $C_1$, are received directly by the cell set. A second communication path is shown between transponder $T_5$ and cell set $C_1$. Signals to and from portable unit 84 are relayed to cell set $C_1$ through transponder $T_5$.

In radio zone 72, the cell set is indicated at $C_2$. A portable unit 86 communicates with cell set $C_2$ through transponder $T_6$.

Figure 3:
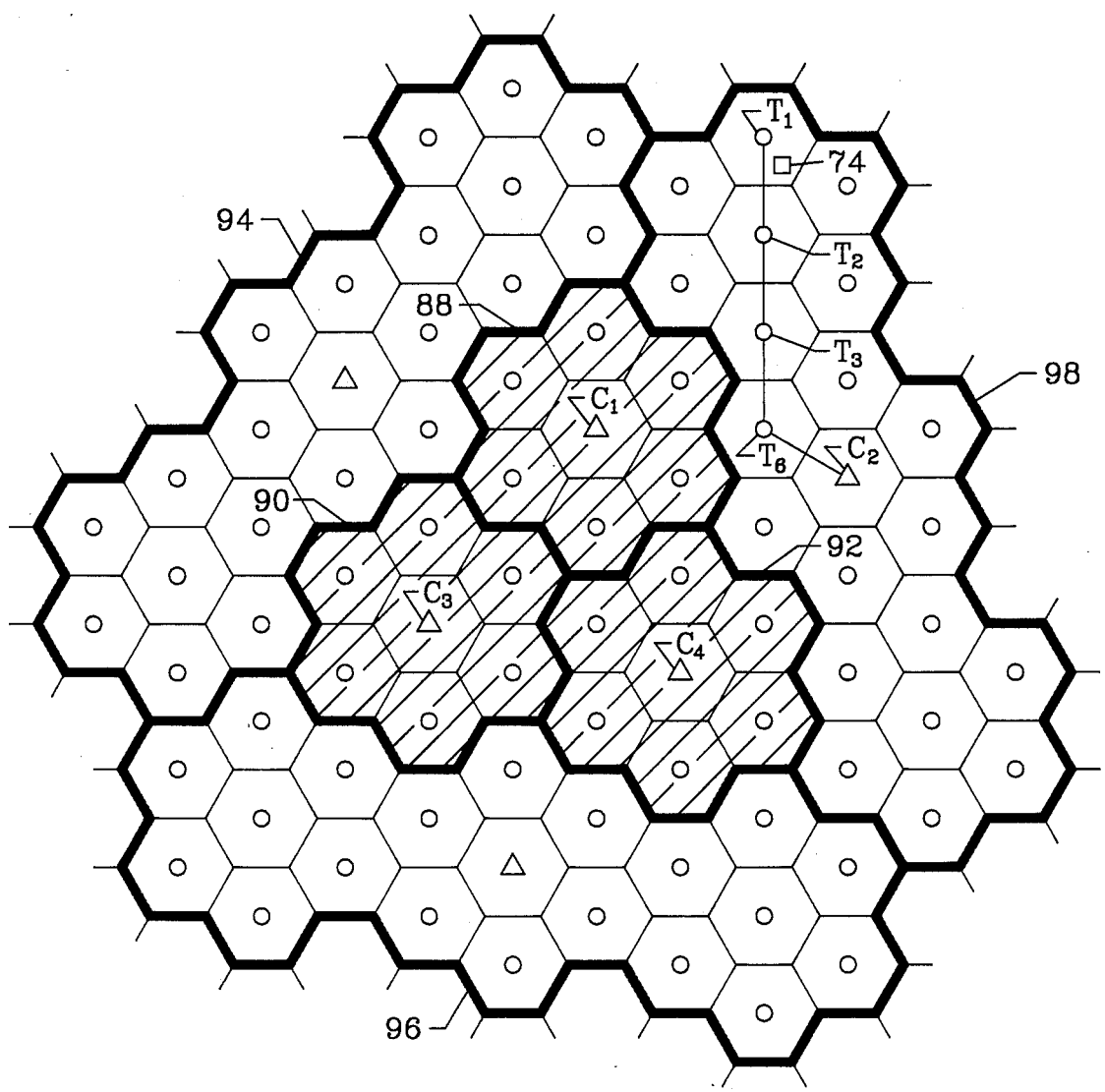
FIG. 3 is a schematic diagram of the same geographical area as in FIG. 2, but showing an alternative arrangement of radio zones.

During business hours, the radio zones are rearranged, as shown in FIG. 3. The business district is divided into three radio zones 88, 90 and 92, each comprising seven hexagons. The outlying residential areas are divided into three radio zones, 94, 96 and 98, each comprising twenty-one hexagons. During business hours, as shown in FIG. 3, signals to and from portable unit 74 are relayed to cell set $C_2$, rather than to cell set $C_1$. Relay takes place through transponders $T_1$, $T_2$, $T_3$ and $T_6$.

With the radio zones arranged as in FIG. 3, the business district can handle more portable telephone traffic, because there is no competition in those zones from portable units outside the business district. On the other hand, with the arrangement depicted in FIG. 2, more portable telephone traffic can be handled in the outlying residential areas. It is possible to rearrange the sizes and shapes of radio zones by activating or deactivating certain cell sets and simultaneously shifting transponders into communication with active cell sets as required. However, usually, all cell sets will remain active at all times as in the system depicted in FIGS. 2 and 3, where for each contraction of one radio zone, there is a corresponding enlargement of one or more other zones.

Figure 4:
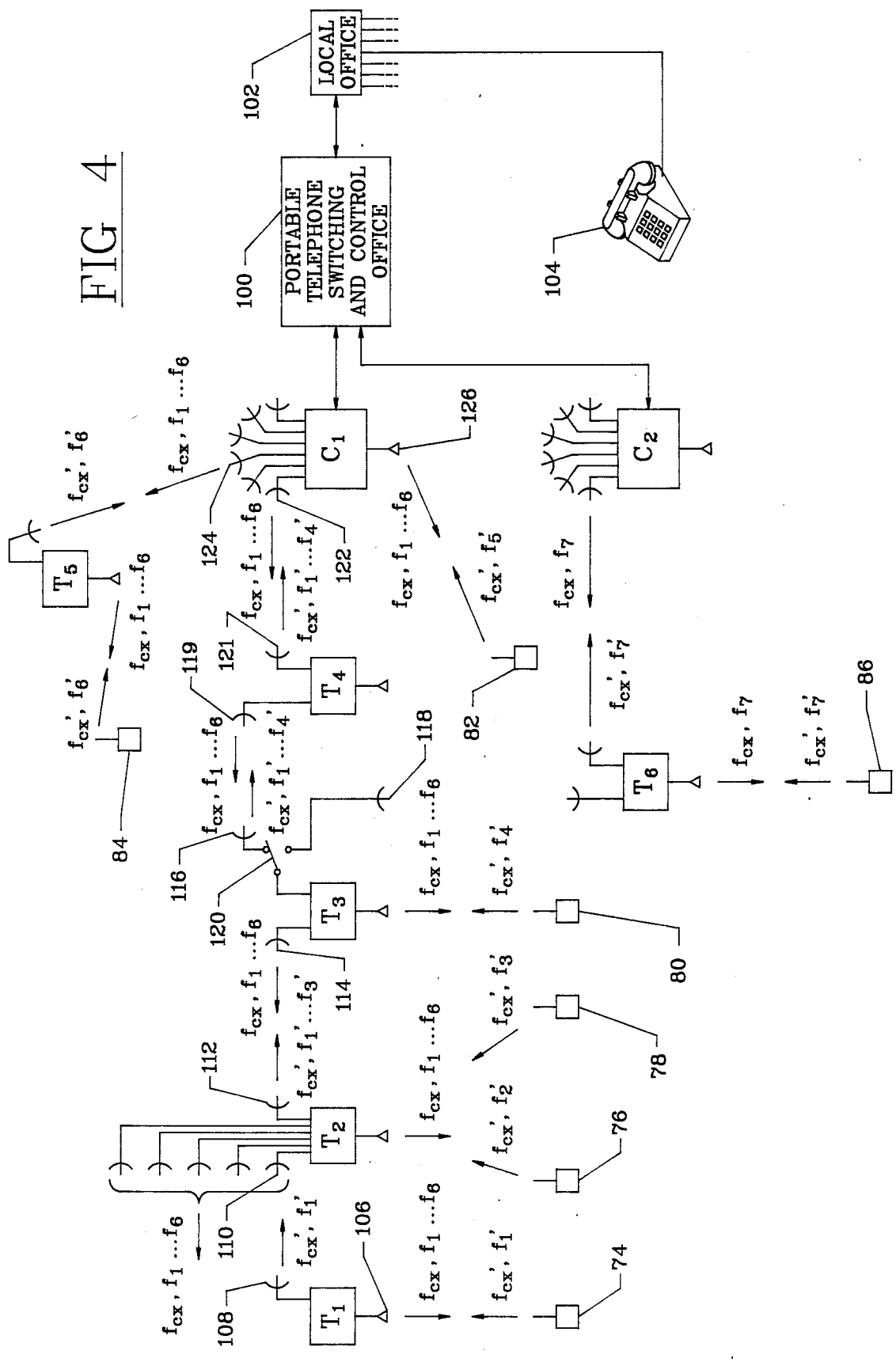
FIG. 4 is a schematic diagram showing details of the communication paths of FIG. 2.

Details of the communication paths shown in FIG. 2 are given in FIG. 4. Cell sets $C_1$ and $C_2$ are connected to portable telephone switching and control office 100, which not only performs signal switching, but also remotely controls operations of the cell sets and transponders. The switching office is connected to a local office 102. Numerous telephones, including telephone 104 are connected to local office 102.

Transponder $T_1$ has an omnidirectional antenna 106, which receives and transmits signals from and to portable units, such as unit 74, within the hexagon containing transponder $T_1$. Transponder $T_1$ also has a directional antenna 108, which is aligned with directional antenna 110 of transponder $T_2$. Signals to and from portable unit 74 are relayed through the communication path established by directional antennas 108 and 110.

Directional antenna 110 is one of six directional antennas connected to transponder $T_2$. Transponder $T_2$ communicates with each of its six adjacent transponders through these directional antennas. With the arrangement as shown in FIGS. 2 and 4, transponder $T_2$ serves as a central unit for relaying singals between transponder $T_3$ on the one hand and transponders $T_1$, $T_7$, $T_8$, $T_9$ and $T_{10}$ on the other. In FIG. 4, the four directional antennas on transponder $T_2$ other than antennas 110 and 112, are coupled to the transponder so that, operationally, they are duplicates of antenna 110. Alternative arrangements are possible. For example, in FIG. 2, transponder $T_3$ could have directional antennas communicating directly with transponders $T_7$ and $T_8$, while transponder $T_2$ could have directional antennas communicating with transponders $T_{10}$, $T_1$ and $T_9$, but not with transponders $T_7$ and $T_8$.

Each portable unit is capable of emitting uplink control signals at any of several frequencies $f_{c1}'$, $f_{c2}'$, etc. Frequencies $f_{c1}'$ and $f_{c2}'$, etc will be referred to collectively as frequencies $f_{cx}'$. For each uplink control frequency, there is a corresponding downlink control frequency. Thus, there is a set of downlink control frequencies $f_{c1}$, $f_{c2}$, etc. collectively referred to as frequencies $f_{cx}$. Therefore, $f_{cx}$ and $f_{cx}'$ represent groups of control frequencies (also referred to as "control channels").

At any given time, each radio zone is assigned a unique control channel, or a unique group of control channels, from the twenty-one control channels available in each of the "A" and "B" bands designated by the Federal Communications Commission. When a telephone call from a portable unit begins, the portable unit scans the available downlink control channels, and selects the control channel having the strongest signal. The portable unit then identifies itself by sending a coded signal on the corresponding uplink control channel. The control and switching office then selects a vacant downlink voice channel from those channels assigned to the radio zone corresponding to that uplink control channel. The vacant downlink voice channel is identified over the downlink control channel, and the portable unit receiver then locks onto the vacant voice channel thus identified. The portable unit then acknowledges receipt of the downlink voice channel by transmitting a coded message on the corresponding uplink voice channel. Lockout automatically occurs when an uplink and downlink voice channel pair is established, so that other portable units within the radio zone cannot use these channels. This procedure for establishing a connection is essentially identical to the procedure carried out in conventional cellular telephone systems.

The portable unit is capable of transmitting voice-modulated signals in any of a number of uplink voice channels $f_1'-f_n'$, and of receiving voice-modulated signals in any of downlink voice channels $f_1-f_n$. Groups of voice channels are assigned to each radio zone. In FIG. 4, the uplink voice channels assigned to the radio zone having cell set $C_1$ are designated $f_1'$ through $f_6'$ and the downlink voice channels are designated $f_1$ and through $f_6$. The number of voice channels assigned to a radio zone can, of course, be more than six. A voice channel pair is assigned to each portable unit immediately following the beginning of a telephone call to or from that unit after contact has been established over a control channel.

For each downlink voice channel $f_x$, there is a corresponding uplink voice channel $f_x'$. In a typical system, each downlink channel is 45 Mhz. above the frequency of its corresponding uplink channel. Channels are established at 30 Khz. intervals. Available voice frequencies are subdivided into groups, and adjacent radio zones are assigned different groups of channels to avoid interference. Non-adjacent radio zones can use the same voice channels.

Cell set $C_1$ sends downlink signals including control channel $f_{cx}$ and voice channels $f_1-f_n$, where $f_n$ is the downlink channel corresponding to the highest numbered uplink channel received by the cell set. Thus, in the case of cell set $C_1$, there are six uplink voice frequencies $f_1'-f_6'$, and consequently there are six downlink voice frequencies $f_1'f_6$.

Voice channel and control signals to and from portable units 76 and 78 are relayed through transponder $T_2$, and through directional antenna 112 of transponder $T_2$ and directional antenna 114 of transponder $T_3$. Signals to and from portable unit 74 are also relayed through the path between directional antennas 112 and 114. Thus, in transponder $T_2$, the uplink signals from portable units 76 and 78 are combined with the uplink signal from portable unit 74, and relayed from transponder $T_2$ to transponder $T_3$. Similarly, the uplink signals from portable unit 80 are combined in transponder $T_3$ with the uplink signals entering transponder $T_3$ through directional antenna 114, and the combined signals are relayed by transponder $T_3$ to transponder $T_4$ through directional antennas 116 and 119. Transponder $T_3$ can be connected alternatively to directional antennas 116 and 118 by antenna switch 120, which is operable by a control signal from office 100. Switch 120, and other switches (not shown) in other parts of the system effect rearrangement of the radio zones. Transponder $T_4$ relays signals between transponder $T_3$ and cell set $C_1$ through directional antennas 121 and 122.

Cell set $C_1$ has six directional antennas. These include antenna 122, and antenna 124, which provides a communication link with transponder $T_5$. Cell set $C_1$ also has an omnidirectional antenna 126, which transmits and receives signals to and from portable units near the cell set such as portable unit 82.

FIG. 4 also shows cell set $C_2$, which is in communication with portable unit 86 through transponder $T_6$. Cell set $C_2$ is in a separate radio zone adjacent to the zone containing cell set $C_1$. Consequently the voice frequency channels used in the zone of cell set $C_2$ should not duplicate those used in the zone of cell set $C_1$. Portable unit 86 is assigned an uplink voice channel $f_7'$ and a downlink voice channel $f_7$. Channels $f_7$ and $f_7'$ are in a group of voice channels assigned to the radio zone of cell set $C_2$, which is different from the group assigned to cell set $C_1$.

Figure 5:
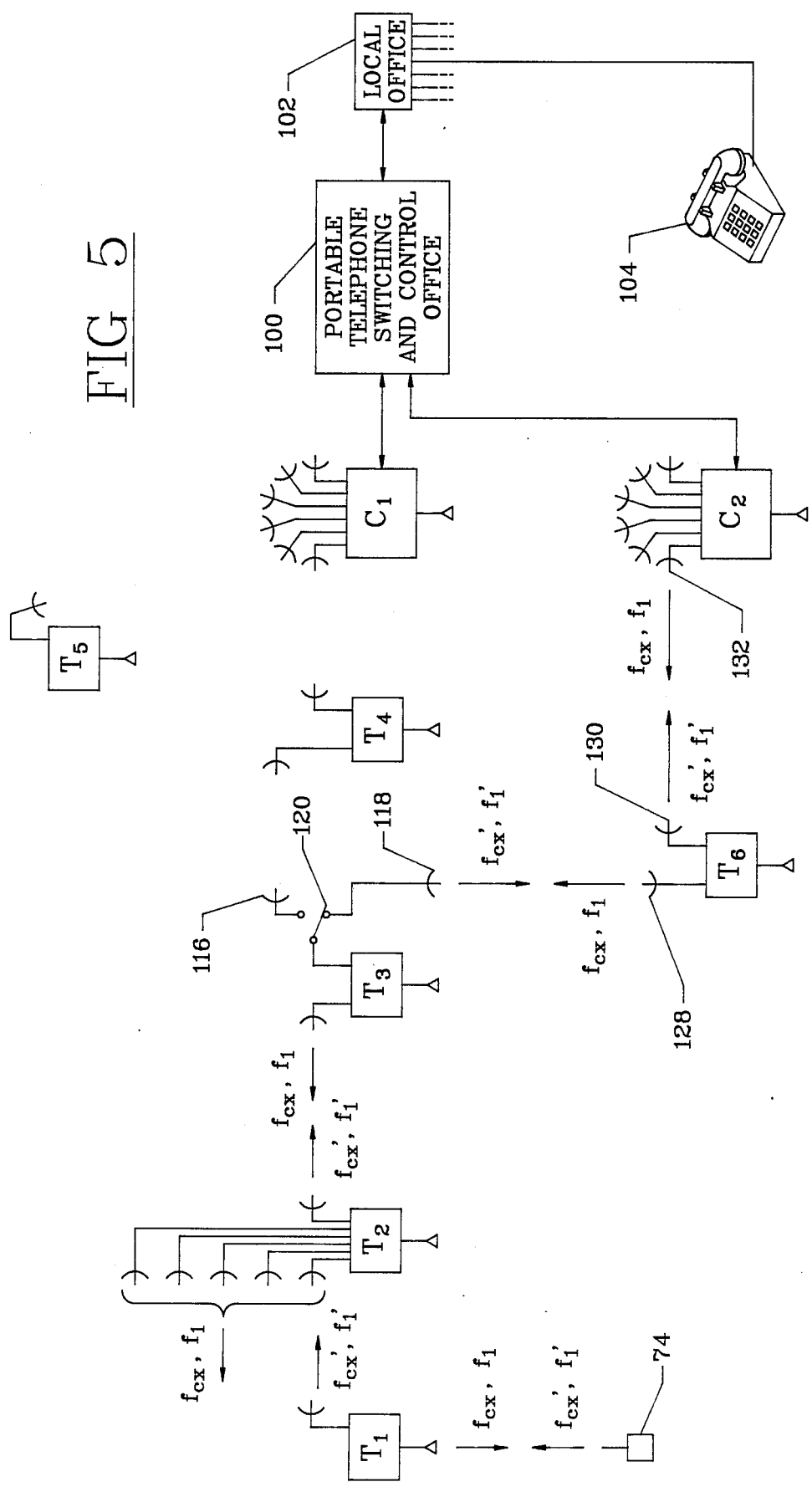
FIG. 5 is a schematic diagram showing details of the communication path of FIG. 3.

FIG. 5 shows the details of the communication path depicted in FIG. 3, in which the radio zone configuration is different from that shown in FIG. 2. Portable unit 74 is in communication with cell set $C_2$ through transponders $T_1$, $T_2$, $T_3$ and $T_6$. Antenna switch 120 connects transponder $T_3$ to directional antenna 118, which is aimed toward directional antenna 128 of transponder $T_6$. The other directional antenna 130 of transponder $T_6$ is aimed toward directional antenna 132 of cell set $C_2$.

There may, of course, be many more portable units in simultaneous use than are depicted in FIGS. 2-5. The number of portable units which can be in use in any given radio zone is limited by the group of voice channels assigned to the radio zone. The size of the group of channels assigned by the switching office to a given zone can be varied in accordance with expected or actual usage, in order to achieve maximum efficiency in the system. Thus, in accordance with the invention, radio zone rearrangement can be used by itself to improve operating efficiency, or both channel reassignment and radio zone rearrangement can be used.

In operation, when a radio zone rearrangement occurs, the switching and control office assigns to each of the current users a new uplink and downlink voice channel pair. A radio zone rearrangement can take place, therefore, with only a momentary interruption in ongoing telephone calls.

The objective of radio zone rearrangement, an example of which is given in FIGS. 2 and 3, is to set up a radio zone on a statistical basis so that the number of portable units likely to be in use in a radio zone at a particular time will not exceed, or at least not greatly exceed the channel handling capability of the cell set for that zone. Thus, if heavy portable telephone traffic is expected in a particular area, the zones may be rearranged so that a zone of reduced size encompasses that particular area. At the same time, areas of reduced portable telephone traffic can be encompassed by expanded zones.

An advantage of changing the shape and size of a radio zone to accommodate changing conditions of usage, is that the zones not involved in the change are not affected. On the other hand, when channel assignments are changed, even in only one radio zone, the channel assignments in many other zones are often affected.

Figure 6:
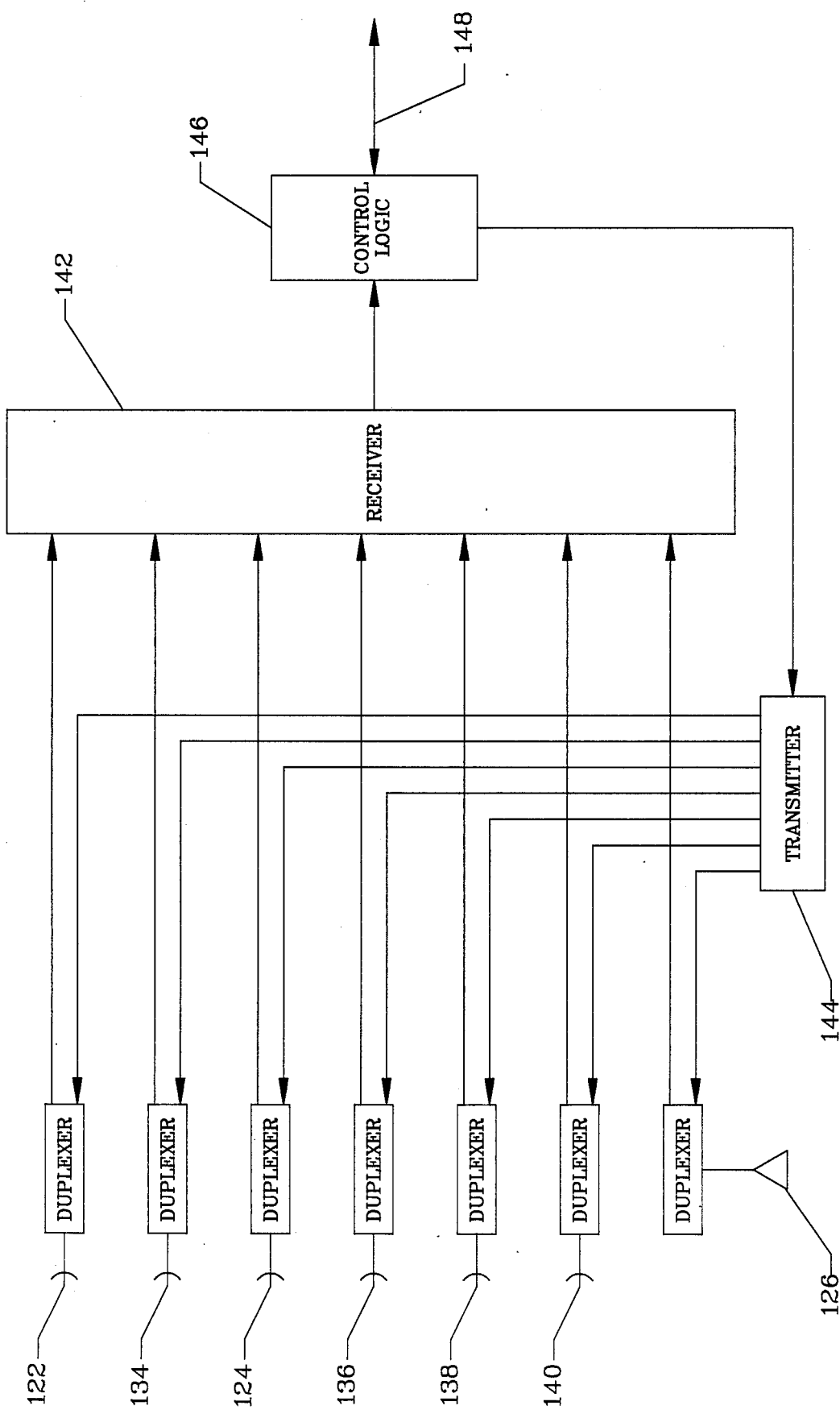
FIG. 6 is a schematic diagram of a typical cell set in accordance with the invention.

FIG. 6 illustrates a typical cell set, such as $C_1$. The cell set of FIG. 6 has six directional antennas 122, 134, 124, 136, 138 and 140, and also has one omnidirectional antenna 126. Assuming the radio zone served by the cell set is made up of hexagonal areas laid out as in FIGS. 2 and 3, the number of directional antennas on the cell set can be as many as six, and as few as one. If the hexagon containing the cell set is completely surrounded by other hexagons in the same radio zone, the number of directional antennas will normally be six. However, in the case of a radio zone comprising a line of hexagons with the cell set in the hexagon at one end of the line, the cell set would normally only have one directional antenna. The directional antennas and the omnidirectional antenna are all connected through conventional duplexers to a receiver 142 and a transmitter 144. The duplexers enable a single antenna to handle transmitted and received signals simultaneously. These signals will normally be at least 25 Mhz. apart. The receiver and transmitter are connected to control logic 146, which is in turn connected through line 148 to a switching and control office, as shown in FIGS. 4 and 5.

The control logic of the cell set may include a control microprocessor and a status memory to retain information including the number of users in the radio zone, identification of the available voice frequencies not in use in the zone, and utilization volume.

The control logic of the cell set may also operate to assign a specific uplink and downlink voice channel pair to each user within the radio zone. Alternatively, this assignment can be carried out under the direction of the switching and control office.

The control logic also controls calling and dialing logic, processes messages delivered through it from receiver 142, and links users in the radio zone with the telephone network. Likewise, it controls transmitter 144 to send messages from the fixed telephone network to the portable units.

Figure 7:
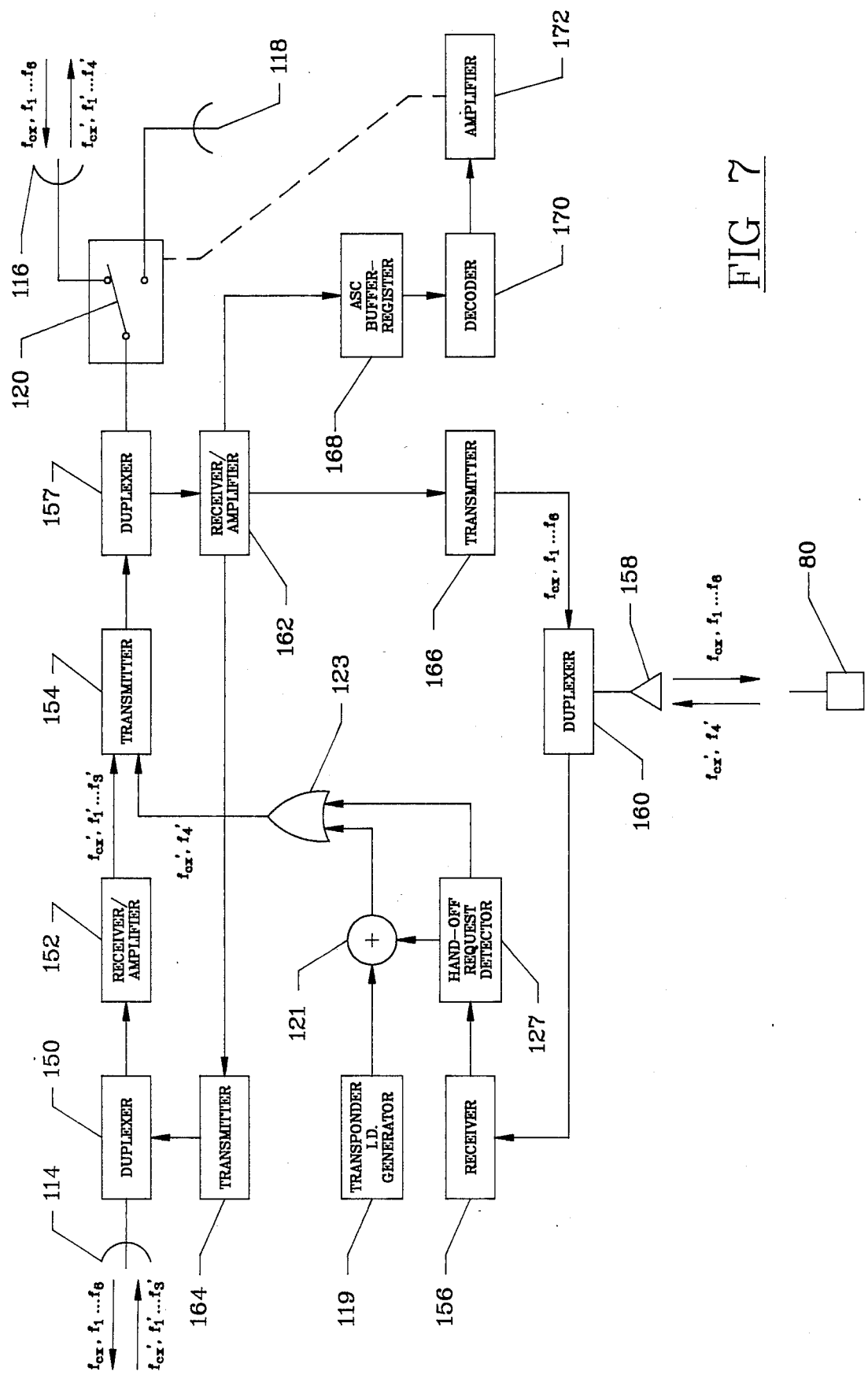
FIG. 7 is a schematic diagram of a typical relay transponder.

FIG. 7 shows details of transponder $T_3$, with its antenna switch 120 in the position shown in FIG. 4. Transponder $T_3$ is typical of the transponder of the system. Its directional antenna 114 is connected through duplexer 150 to a receiver/amplifier 152. Frequencies $f_{cx}'$ and $f_1'-f_3'$ are transmitted through the duplexer and receiver/amplifier to transmitter 154, where they are combined with signals from OR-gate 123, including a control signal at frequency $f_{cx}'$ and a voice signal at frequency $f_4'$. The output of transmitter 154 is delivered to duplexer 157, which is connected through switch 120 to antenna 116.

The signals entering transmitter 154 at frequencies $f_{cx}'$ and $f_4'$ are uplink signals from a portable unit 80, received by omnidirectional antenna 158 and delivered through duplexer 160 and receiver 156.

Downlink signals at frequencies $f_{cx}$ and $f_1-f_6$, received by directional antenna 116, are connected through switch 120 and duplexer 157 to receiver/amplifier 162, the output of which is connected to transmitters 164 and 166. The output of transmitter 164 is delivered through duplexer 150 to directional antenna 114, and the output of transmitter 166 is delivered through duplexer 160 to omnidirectional antenna 158.

In the operation of the transponder shown in FIG. 7, uplink frequencies received by directional antenna 114 and by omnidirectional antenna 158 are combined and are all transmitted (toward a cell set) through directional antenna 116 (or through antenna 118, if selected by switch 120). Although uplink signals are combined, downlink signals are not split. Every downlink frequency received by directional antenna 116 is retransmitted through directional antenna 114 and also through omnidirectional antenna 158.

The receiver/amplifiers, and the duplexer and transmitters as well, in the transponder, are preferably capable of handling both the A and B bands, designated for cellular service by the rules of the Federal Communications Commission, 47 CFR §22.902. Thus, elements handling uplink signals should have a bandwidth encompassing 825.030 Mhz.–844.980 Mhz. Elements of the transponder which handle downlink signals should have a bandwidth encompassing 870.030 Mhz.–889.980 Mhz.

An antenna switching command from a cell set ($C_1$ or $C_2$, depending on which of antennas 116 and 118 is connected to the transponder) is delivered through antenna switch 120, duplexer 157, and receiver/amplifier 162 to an antenna switch command (ASC) buffer register 168. The output of ASC buffer register 168 is decoded by decoder 170, which controls operation of antenna switch 120, through power amplifier 172, which delivers a pulse causing the antenna switch to shift from antenna 116 to antenna 118 or vice versa.

The remainder of the elements in FIG. 7 pertain to the processing of hand-off information. In many transponders, the output of receiver 156 can be connected directly to an input of transmitter 154. However, in some transponders, particularly in irregularly shaped radio zones, the central office may need an identification from the transponder in order to determine which radio zone the portable unit is entering. To accomplish this, a hand-off request detector 127 and a transponder I.D. generator 119 are provided. The output of receiver 156 is connected to transmitter 154 through hand-off request signal detector 127 and OR-gate 123. An output of detector 127 is merged with an output of transponder I.D. generator 119 by means of adder 121, the output of which goes to transmitter 154 through OR-gate 123.

As noted previously, during a telephone conversation, a portable unit can move about from hexagon to hexagon within a given radio zone without the uplink or downlink frequencies being changed. In other words, there is no hand-off as the portable unit moves from one hexagon to another in the same radio zone. Rather, the closest transponder takes over gradually as the portable unit moves. All portable units within a given radio zone operate in different voice channels. As stated previously, $f_{cx}$ represents a number of control frequencies, as does $f_{cx}'$. The control signals require only short time intervals. Therefore, each control channel can accommodate many users.

Figure 8:
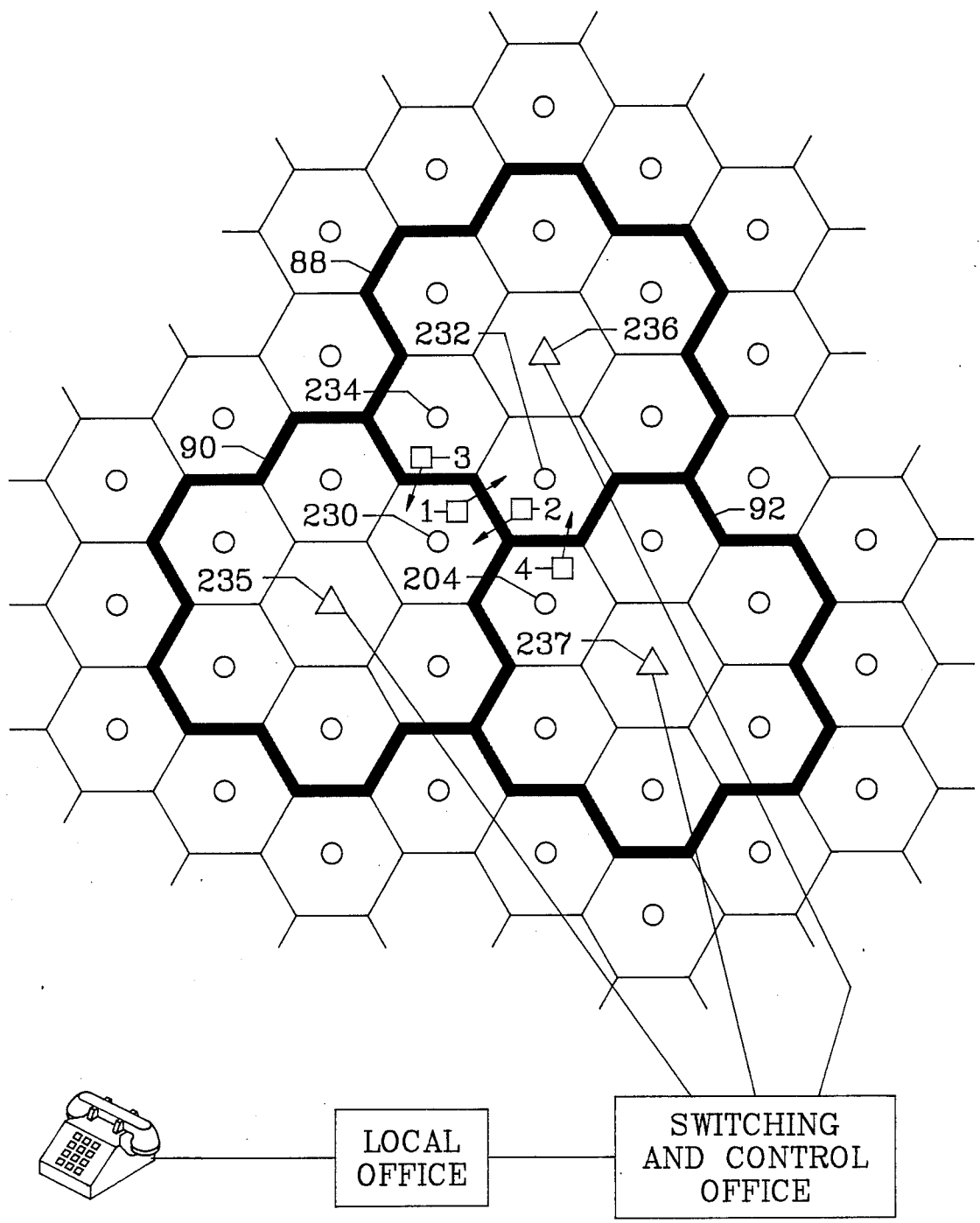
FIG. 8 is a schematic diagram of a set of radio zones, showing portable units, each of which is moving from one radio zone to another.

When a portable unit moves from one radio zone to another, a hand-off occurs. FIG. 8 shows radio zones 88, 90 and 92, with four portable units 1-4, each moving from one radio zone to an adjacent zone.

Figure 12:
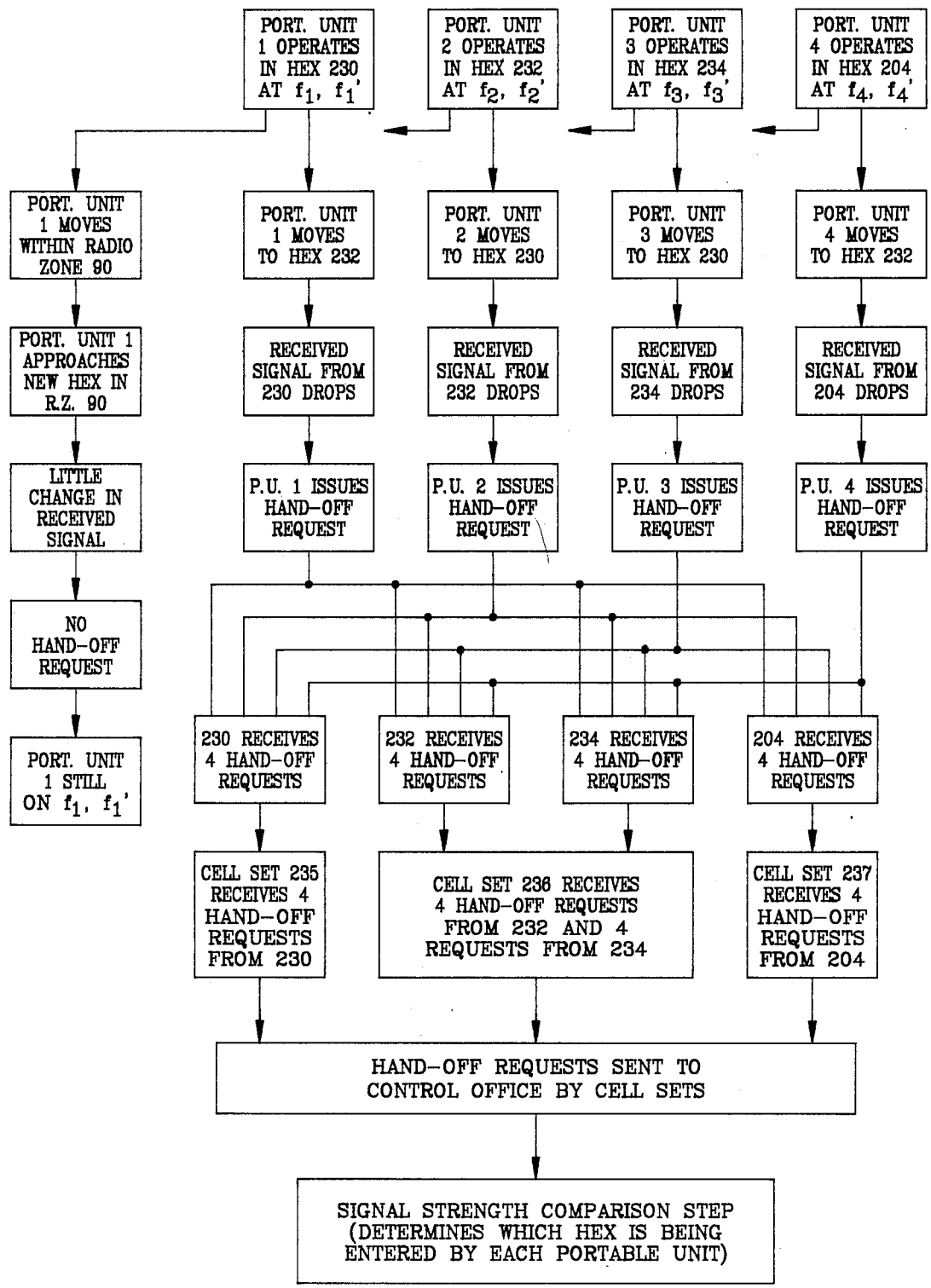
FIG. 12 is a flow chart depicting the hand-off sequence in accordance with the invention.

In each portable unit, the modulation level of the received voice signal is sampled, and an average value established continually. This average value is compared with a predetermined threshold level. If the average value of the voice signal modulation falls below the threshold level, a hand-off request signal is transmitted by the portable unit in short bursts over the voice channel. The signal is in the format shown in FIG. 9. It contains the request and identifies the portable unit making the request. The signal is transmitted via several transponders and by two or more cell sets to the central control and switching office. The central office determines which radio zone the portable unit is in and which radio zone the unit is going to by comparing the strengths of the hand-off request signals. Where transponder identification is needed to enable the central office to determine where the portable unit is going, the transponder I.D. is provided by generator 119, the output of which is added to the hand-off request and merged with non-hand-off signals in OR-gate 123, as shown in FIG. 7. The format of the output of adder 121 is seen in FIG. 10. The central office then selects an available voice frequency from those that can be used in the new radio zone, alerts the new cell set that a hand-off is about to occur and identifies the portable unit and the frequency to be used. Next, the central office, via the cell set and the transponder, sends a message to the portable unit to switch to the new frequency and radio zone. The portable unit acknowledges receipt of the message with a brief burst of signal over the original voice frequency, turns off its receiver and then retunes to its new channel. The central office, recognizing the burst of signal, turns off the old frequency and switches the trunk line to the new frequency. The portable unit then starts to transmit over the corresponding uplink frequency and the central office knows that a successful hand-off has been completed. The above may be seen in diagrammatic form in FIG. 12. FIG. 12 also shows that when unit 1 moves from one hexagon to another within a radio zone, no hand-off occurs.

Figure 11:
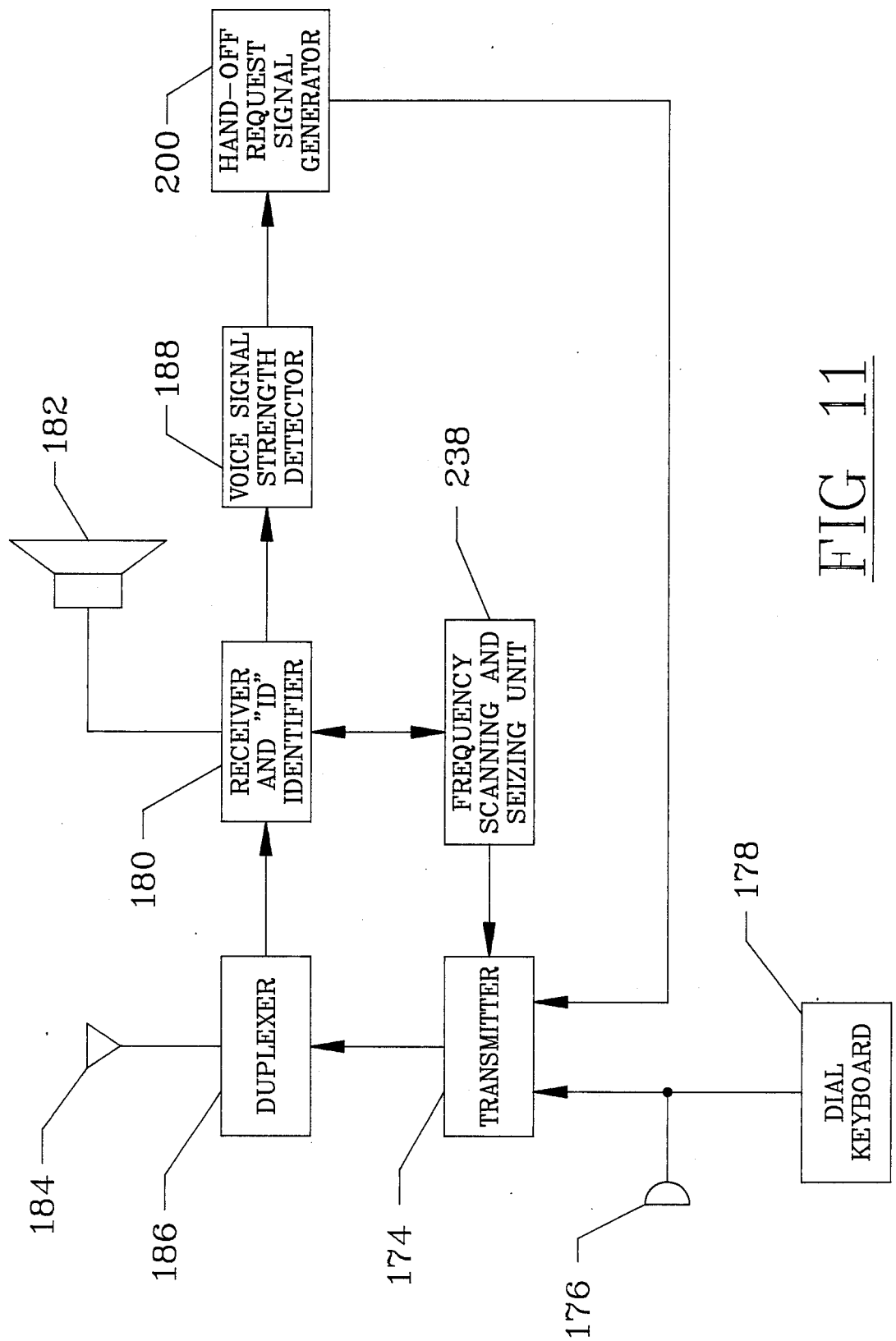
FIG. 11 is a schematic diagram of a portable unit.

Referring to FIG. 11, the portable unit comprises a transmitter 174, to which are connected a microphone 176 and a "touch tone" keyboard 178. The portable unit also comprises a receiver 180, which drives a speaker 182. Both the transmitter and receiver are connected to antenna 184 through duplexer 186.

The modulation level of the received signal is sampled by voice signal strength detector 188, which, if the average modulation level falls below a predetermined threshold, indicates that the portable unit is moving from one radio zone to another, and triggers hand-off request signal generator 200, which causes transmitter 174 to send out a hand-off request.

The receiver also includes an "I.D. identifier", which identifies the telephone number of the portable unit.

When the portable unit receives a response to a hand-off request containing information on the available voice frequency channel, the frequency scanning and seizing unit 238 locks receiver 180 onto the available downlink frequency. The scanning and seizing unit automatically scans frequencies over a short range on both sides of the assigned downlink frequency, and locks onto the frequency of the downlink carrier signal for optimum reception. At the same time, unit 238 causes transmitter 174 to lock onto a corresponding uplink frequency.

The system of the invention can be readily adapted to existing cellular telephone systems by providing relay transponders at selected locations in each radio zone. The hand-off procedure is essentially the same as that used in conventional cellular systems, except that the need for hand-off is determined by monitoring downlink signal strengths rather than by monitoring uplink signal strengths. Generating a hand-off request signal in the portable unit when the average level of the downlink signal drops, eliminates the complex computer operations required in conventional cellular systems to keep track of portable units.

The use of two-way relay transponders allows the portable units to be smaller and lighter in weight than conventional portable units. The use of two-way relay transponders has the additional advantage that it permits operating efficiency to be achieved easily by rearrangement of radio zones to accommodate changing conditions of use.

Rearrangement of radio zones is especially easy to accomplish where two-way relay transponders are used. However, zone rearrangement can also be carried out advantageously in systems in which each radio zone has one or more base stations, each with a central transmitting antenna covering the entire zone and several receiver sites at separate locations in the zone in order to reduce talk back distance for the portable units. For example, in such a system, an original radio zone might initially have two base stations, each surrounded by a set of receiver sites. One of the base stations and its surrounding receiver sites could be dissociated from the other base station in the same zone and associated with another base station to form a new zone having two base stations and to reduce the original radio zone to one having a single base station, and therefore a higher radio of available channels to the number of users within the zone.

The components and configurations of the portable units, transponders and cell sets, and their geographical arrangements can of course be modified. For example, a cell set can be located adjacent to the boundary of a radio zone.

Changing the shape of radio zones by switching of directional antennas under the control of the switching office can be carried out automatically in response to changing demand conditions sensed by the switching office computer.

Although the invention is primarily useful for portable radiotelephone communications, it can also be used advantageously in fixed telephone communications networks. These networks can be set up rapidly and inexpensively as the invention eliminates the need for overhead or underground wires and cables. The invention also makes it possible to relocate telephones in offices and homes more easily, by eliminating the need for rewiring. It also makes it possible for a telephone subscriber to move from one location to another without involving the telephone company.

Other modification can be made without departing from the scope of the invention as defined in the following claims.

I claim:

1. A communications system providing radiotelephone communication between two-way radiotelephone units and other telephones comprising:

(a) a telephone switching and control office;

(b) at least one local telephone office connected to the switching and control office and including means to connect the switching and control office to selected telephones;
(c) a plurality of cell sets, each connected to the switching and control office through a two-way communication link;
(d) a plurality of relay transponders associated with each cell set, each cell set and its associated transponders being located in a separate geographically defined radio zone;
(e) means within each radio zone providing a two-way radio communication link between each transponder in the zone and the cell set in the same zone; and
(f) a plurality of radiotelephone units; wherein
(g) each transponder includes means for relaying uplink and downlink radio signals between its associated cell set and radiotelephone units in the vicinity of the transponder; and
(h) each cell set includes means for relaying two-way communications signals between its associated transponders and the switching office, and also includes means for communicating directly with radiotelephone units in the vicinity of the cell set and for relaying two-way communications signals between the last-mentioned radiotelephone units and the switching office.

2. A communications system according to claim 1 in which, in at least one radio zone, the two-way radio communications link between at least one relay transponder and its associated cell set includes at least one other relay transponder in the same ratio zone.

3. A communications system according to claim 1 including switching means for breaking the two-way radio communications link between at least one transponder and its associated cell set and establishing a new two-way radio communications link between said one transponder and a different cell set.

4. A communications system according to claim 1 in which each of the transponders in each radio zone of the system includes means for relaying voice communications signals toward its associated cell set in a set of uplink voice channels, and for relaying voice communications signals from its associated cell set toward radiotelephone units in a set of downlink voice channels, the set of uplink voice channels for each transponder being the same as the set of uplink voice channels for every other transponder in the same radio zone, and the set of downlink voice channels for each transponder being the same as the set of downlink voice channels for every other transponder in the same radio zone, whereby a radiotelephone unit can move throughout a radio zone while using a single pair of uplink and downlink voice communication channels.

5. A communications system according to claim 4 in which each of the radiotelephone units includes means for transmitting a hand-off request signal when the strength of the receive downlink voice channel falls below a predetermined level.

6. A communications system according to claim 4 in which every radio zone is assigned a set of uplink and downlink voice channels and in which every uplink and downlink voice channel assigned to each radio zone is different from every uplink and downlink voice channel assigned to each adjacent radio zone.

7. A communications system providing radiotelephone communication between two-way radiotelephone units and other telephones comprising:
(a) a telephone switching and control office;
(b) at least one local telephone office connected to the switching and control office and including means to connect the switching and control office to selected telephones;
(c) a plurality of cell sets, each connected to the switching and control office through a two-way communication link;
(d) a plurality of relay transponders associated with each cell set, each cell set and its associated transponders being located in a separate geographically defined radio zone;
(e) means within each radio zone providing a communication link between each transponder in the zone and the cell set in the same zone; and
(f) a plurality of radiotelephone units; wherein
(g) each transponder includes means for relaying at least uplink signals between radiotelephone units in its vicinity and its associated cell set; and
(h) each cell set includes means for relaying at least uplink signals between its associated transponders and the switching office; and
(i) said communications system includes switching means for breaking the communications link between at least one transponder and its associated cell set and establishing a new communications link between said one transponder and a different cell set.

* * * * *